United States Patent

Woodcock

[15] 3,648,180

[45] Mar. 7, 1972

[54] PULSE GENERATORS

[72] Inventor: Terence Keith Woodcock, Barton-le-Clay, England

[73] Assignee: British Aircraft Corporation Limited, London, England

[22] Filed: Oct. 6, 1970

[21] Appl. No.: 78,410

[52] U.S. Cl. ...................................328/59, 328/37, 328/61, 328/188
[51] Int. Cl. .........................................................H03k 1/00
[58] Field of Search ................328/37, 61, 59, 187, 188, 189; 307/221, 271

[56] References Cited

UNITED STATES PATENTS 3,411,094  11/1968  Martinek ..................................328/37
3,439,279  4/1969  Guanella ..............................328/37 X
3,464,018  8/1969  Cliff ........................................328/61

*Primary Examiner*—John Zazworsky
*Attorney*—Kemon, Palmer & Estabrook

[57] ABSTRACT

The pulse generator is described in which a pair of storage registers are connected in parallel with one another and initially loaded such that a first of the registers has a substantially smaller unfilled capacity than the second register. A clock generator then feeds pulses equally to the two registers to progressively reduce the unfilled capacity of each register and when the first register has been filled a 'full' signal is generated which causes immediate reloading of the first register to the same initial capacity. A logic circuit connected to selected bit outputs of the first register generates a pulse, or a pulse pattern, during the time taken to fill the first register and when the second register has been filled a second 'full' signal inhibits the feeding of further clock pulses to the register. The total number of pulse cycles is therefore the ratio of the initially unfilled capacity of the second register to the unfilled capacity of the first register.

3 Claims, 2 Drawing Figures

Fig. 1.

PULSE GENERATORS

When automatic test equipment is operated in a self-test mode, a pulse generator is normally provided to generate pulses which simulate those which would otherwise be provided by the system under test. The pulse generator may also be used during prime testing of the equipment, and to generate pulses for the test inputs of subsystems.

In such equipment, it is clearly advantageous to have a pulse generator which is driven from a single clock but which nevertheless can produce a predetermined cyclic pulse pattern depending on the test being simulated. It is also preferable to run the clock substantially continuously during a test, and frequently it is important that the exact number of pulses, or pulse patterns, generated during a test should be controlled.

According to the present invention a pulse generator comprises a pair of storage registers initially loaded such that a first of the registers has a substantially smaller unfilled capacity than the second register, a clock for feeding pulses equally to the two registers to progressively reduce the unfilled capacity of each register, means responsive to the filling of the first register for momentarily inhibiting the feeding of clock pulses to the registers and immediately reloading the first register to the same initial capacity, a logic circuit connected to selected bit outputs of the first register to generate an output pulse, or pulse pattern, during the time taken to fill the first register, and means responsive to the filling of the second register to inhibit the feeding of further pulses to the registers whereby the total number of output pulses, or pulse patterns, generated is the ratio of the initially unfilled capacity of the second register to the initially unfilled capacity of the first register.

In a preferred embodiment of the invention a 'full' signal is generated whenever the first register is filled and this signal momentarily inhibits the feeding of clock pulses and causes a third register (initially loaded to the same capacity as the first register) to empty its contents into the first register. The third register acts as a temporary store and has a parallel input from an address. During the subsequent filling of the first register in the next cycle, the third register is again loaded to the same capacity from the address.

During the reloading of the first register the clock is momentarily inhibited, and thus the period between the successive first register 'full' signals is determined by the unfilled capacity of the first register (and hence of the third register), the clock pulse rate frequency, and the clock inhibit time during the reload. Thus simply by varying the initial loading of the first and third registers, the period of the successive output pulses, or pulse patterns can be varied.

One example of the invention will now be described with reference to the accompanying drawings in which.

Figure 1:
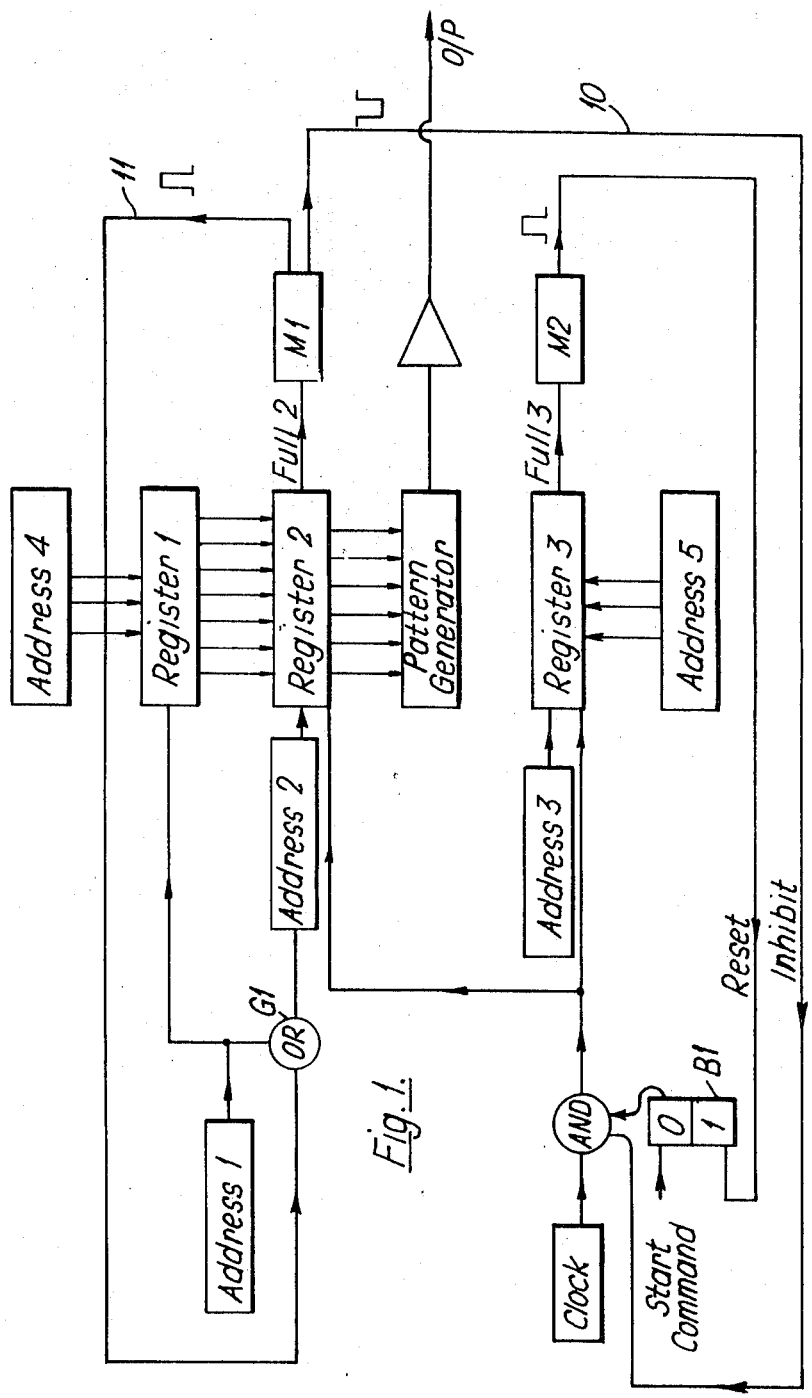
FIG. 1 is a logic diagram of a circuit for generating a pulse pattern.

Referring to FIG. 1, storage register 2 and storage register 3 comprise first and second storage registers for controlling the pattern produced by the pattern generator. Each of these two registers are capable of addition as well as being able to be parallel loaded from an address. Register 1, on the other hand, is a memory which is capable of being parallel loaded from an address and acts as a temporary store for the bits to be loaded in register 2.

Registers 1 and 2 are initially filled to a predetermined capacity in response to a load command from address 1. This command enables register 1 which is parallel loaded from address 4, and the load command is also transmitted to address 2 through the 'OR'-gate G1 to enable register 2. Register 2 is, therefore, parallel loaded from register 1 and is therefore filled to the same capacity as register 1.

At the same time, register 3 is parallel loaded from address 5 in response to a load command from address 3, but the unfilled capacity of register 3 is arranged to be much higher than that of register 2.

In response to a start command applied to bistable B1, the clock 'AND' gate is enabled and pulses are simultaneously fed to registers 2 and 3. Since register 2 has the smaller unfilled capacity, this will fill before register 3. Selected bit outputs from register 2 are fed to the pattern generator so that during the time taken to fill register 2 a pulse pattern is fed out of the generator. A "full 2" signal signifies that register 2 has been filled, and this switches monostable M1 so that a positive pulse is fed along path 11 and a negative pulse along path 10. The negative pulse momentarily inhibits the clock 'AND' gate and the positive pulse is fed to the 'OR'-gate G1. The output from the 'OR' gate enables the register 2 from address 2 and, register 2 is therefore immediately reloaded from register 1.

This cycle of events is repeated until register 3 is filled when a 'full 3' signal switches monostable M2 to reset the bistable B1 and thereby permanently inhibit further clock pulses until another start command signal is generated. Clearly, the number of pulse patterns produced in the time taken to fill register 3 will be the ratio of the initially unfilled capacity of the register 3 to the unfilled capacity of register 2. This ratio can easily be varied. The period of the successive pulse patterns, i.e., the period between successive 'full 2' signals is determined by the unfilled capacity of register 2, the clock pulse frequency and the clock inhibit time during reload. Hence, by varying the initial loading of registers 1 and 2 from address 4, the period of the pulse pattern is easily varied.

Figure 2:
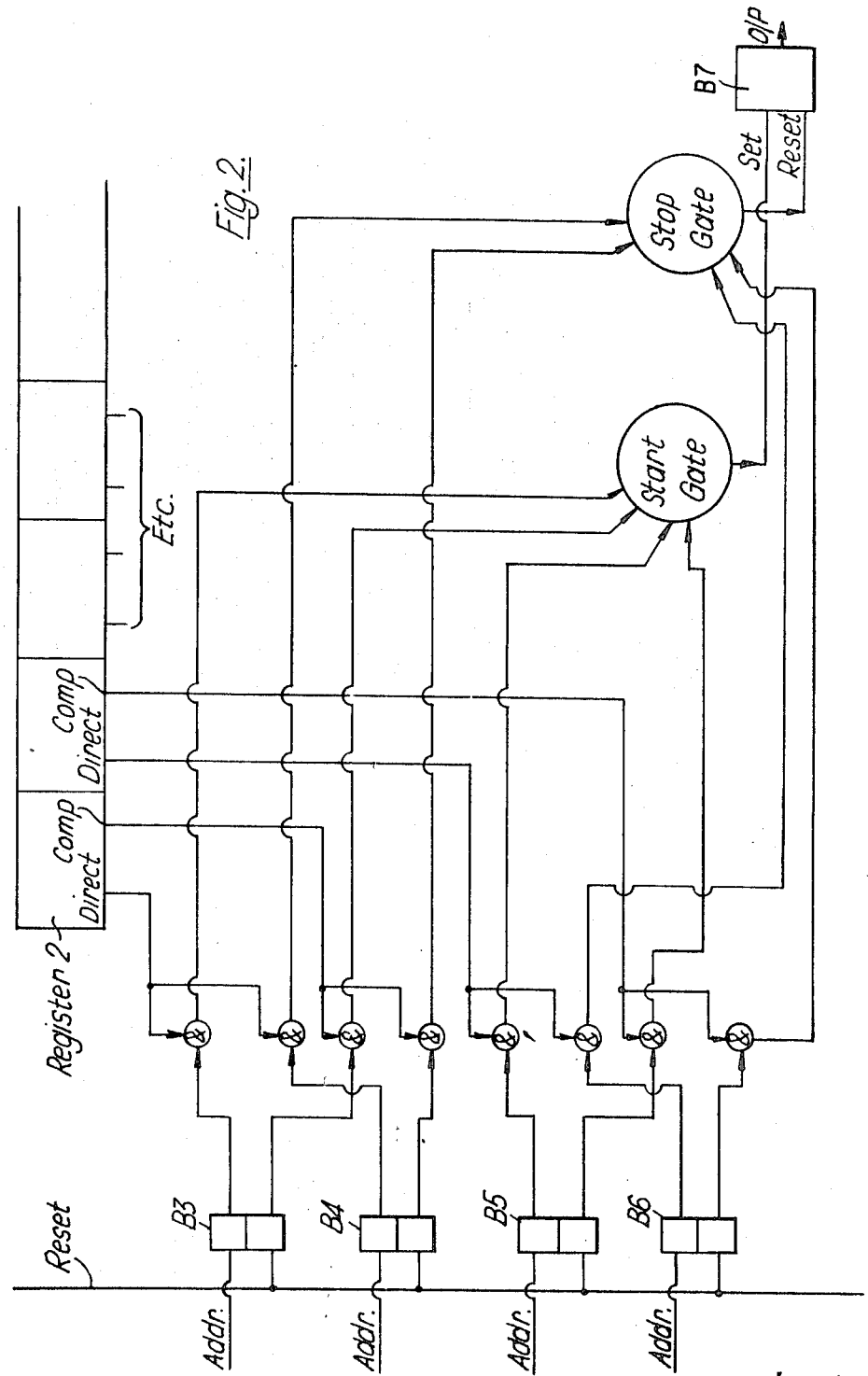
FIG. 2 is a logic diagram of the pattern generator shown in FIG. 1.

Referring now to FIG. 2, one example of a suitable pattern generator is shown in detail. The selected bit outputs from register 2 are taken to 'AND' gates which are also fed with the inverted or normal outputs from bistables B3, B4, B5 and B6. Additional bistables and 'AND' gates can be connected in a similar fashion to the remaining bit outputs of register 2. The particular pattern to be generated is set by feeding predetermined address signals to the bistables B3–B6. The outputs from B3 and B5 control a "start" gate so that the bistable B7 is set when the direct and complementary bit outputs from register 2 signify that the count in register 2 has reached a particular count. As the count proceeds, bistables B4 and B6 produce signals which enables a "stop" gate to reset the bistable B7. Any desired pattern can, therefore, be produced by connecting selected bit outputs into the circuit. The output from the bistable B7 comprises the final output of the pattern generator and this is fed to an output stage which will include power amplifiers and impedance convertors.

One numerical example will now be described with reference to FIG. 1. Consider register 2 to have a capacity of 10,000 and register 3 to have a capacity of 100,000. Register 2 is initially loaded with 7,500 and register 3 is initially loaded with 20,000. For a clock rate of 1 mc./s. the unfilled capacity of register 2 (which must be equal to register 1) is filled in 2.5 ms. Thus, the desired pulse pattern will be produced during this 2.5 ms. As mentioned above, the number of times the pattern will be repeated depends on the ratio of the unfilled capacities of register 2 and register 3. In this example the pattern will, therefore, be repeated 32 times with a frequency of 400 c./s.

It is possible to vary the whole time-base of the pulse pattern by adding a further pair of registers corresponding to registers 1 and 2. If the basic clock is changed to 10 mc./s. and the additional registers are loaded with 80 out of a total capacity of 100, then the additional register 2 would produce 4,000 pulse patterns at a frequency of 500 kc./s., while the 32 pulse patterns from the original register 2 would have a pulse rate frequency of 4,000 c./s.

I claim:

1. A method of deriving a pulse train having a predetermined number of pulses comprising: initially loading a pair of storage registers such that a first of the registers has a substantially smaller unfilled capacity than the second register, feeding clock pulses equally to the two registers to progressively reduce the unfilled capacity of each register, momentarily inhibiting the feeding of clock pulses to the registers in response to the filling of the first register and immediately reloading the first register to the same initial capacity, feeding selected bit outputs of the first register to a logic circuit to generate an output pulse, or a pulse pattern, during the time taken to fill the first register, and inhibiting the feeding of further pulses to the registers in response to the filling of the second register whereby the total number of output pulses, or pulse patterns, generated is the ratio of the initially unfilled capacity of the second register to the unfilled capacity of the first register.

2. A pulse generator for generating a pulse train having a predetermined number of pulses, or pulse patterns, comprising a pair of storage registers, a clock for feeding pulses equally to the two registers, means responsive to the filling of a first of the registers for momentarily inhibiting the clock pulses to the registers and immediately reloading the first register, a logic circuit connected to selected bit outputs of the first register to generate an output pulse, or a pulse pattern, during the time taken to fill the first register, and means responsive to the filling of the second register to inhibit the feeding of further pulses to the registers, whereby, if the two registers are repeatedly loaded such that the first register has a substantially smaller unfilled capacity than the second register, the total number of output pulses, or pulse patterns generated is the ratio of the initially unfilled capacity of the second register to the initially unfilled capacity of the first register.

3. A pulse generator according to claim 2 further including a third register, so arranged that the contents of the third register are parallel loaded into the first register in response to a signal signifying that the first register has been filled.

* * * * *